(12) United States Patent
Wadhwa et al.

(10) Patent No.: US 9,939,821 B2
(45) Date of Patent: Apr. 10, 2018

(54) COMPUTER IMPLEMENTED BLEND CONTROL SYSTEM AND METHOD FOR PREPARATION OF A HYDROCARBON BLEND

(71) Applicant: Reliance Industries Limited, Mumbai (IN)

(72) Inventors: Anil Wadhwa, New Delhi (IN); Ashish Ranjan Jha, Vadodara (IN); Chandra Saravanan, Navi Mumbai (IN); Asit Kumar Das, Jamnagar (IN); Pinakiranjan Sankarprasad Patra, Ahmedabad (IN); Sukumar Mandal, Faridabad (IN); Praveen Kumar Chinthala, District: Medak (IN); Gopal Ravichandran, Coimbatore (IN); Sudhirkumar Raojibhai Patel, Dist-Vadodara (IN); Anand Raj Rajan, Pondicherry (IN); Ashok Swamisharan Pathak, Nagpur (IN); Saumya Srivastava, Lucknow (IN)

(73) Assignee: Reliance Industries Limited, Mumbai (IN)

(*) Notice: Subject to any disclaimer, the term of this patent is extended or adjusted under 35 U.S.C. 154(b) by 472 days.

(21) Appl. No.: 14/150,349

(22) Filed: Jan. 8, 2014

(65) Prior Publication Data
US 2014/0195055 A1    Jul. 10, 2014

(30) Foreign Application Priority Data
Jan. 8, 2013   (IN) .............................. 60/MUM/2013

(51) Int. Cl.
*G05D 11/00*   (2006.01)
*G05D 11/13*   (2006.01)

(52) U.S. Cl.
CPC .......... *G05D 11/00* (2013.01); *G05D 11/135* (2013.01); *G05D 11/139* (2013.01)

(58) Field of Classification Search
None
See application file for complete search history.

(56) References Cited

U.S. PATENT DOCUMENTS 3,672,840 A   6/1972   Fenske et al.
3,751,644 A   8/1973   Mayer
(Continued)

FOREIGN PATENT DOCUMENTS

| GB | 1170616 | 11/1969 |
| GB | 1419655 | 12/1975 |
| JP | 5-163493 | 6/1993 |

*Primary Examiner* — Sean E Conley
*Assistant Examiner* — Benjamin R Whatley
(74) *Attorney, Agent, or Firm* — McCarter & English, LLP

(57) ABSTRACT

A computer implemented blend control system and method for preparation of a hydrocarbon blend from a plurality of component streams have been disclosed. The system includes a product tank for receiving a mixture comprising the plurality of component streams. The system further includes a sensor and analyzer adapted to sense and analyze a first attribute of the received mixture for obtaining a first attribute data. The system further includes an optimizer which stores the attribute based model data, receives the first attribute data and compares the received first attribute data with the attribute based model data to compute an optimized proportion data, based on which the component streams are selectively drawn into the product tank for preparing the hydrocarbon blend.

4 Claims, 4 Drawing Sheets

(56) References Cited

U.S. PATENT DOCUMENTS

| | | | | |
|---|---|---|---|---|
| 5,223,714 | A * | 6/1993 | Maggard | G01N 21/359 |
| | | | | 250/339.12 |
| 5,600,134 | A * | 2/1997 | Ashe | G01N 33/2829 |
| | | | | 250/252.1 |
| 5,684,580 | A * | 11/1997 | Cooper | G01N 33/2835 |
| | | | | 356/301 |
| 6,290,734 | B1 * | 9/2001 | Scott | C10L 1/023 |
| | | | | 208/17 |
| 6,966,326 | B2 | 11/2005 | Murray et al. | |
| 2004/0250850 | A1 * | 12/2004 | Murray | G05D 11/131 |
| | | | | 137/93 |
| 2006/0035381 | A1 * | 2/2006 | Bary | B01F 15/00207 |
| | | | | 436/55 |
| 2011/0160921 | A1 * | 6/2011 | Petit | G05D 11/139 |
| | | | | 700/285 |
| 2012/0114813 | A1 * | 5/2012 | Bippert | A23L 2/02 |
| | | | | 426/231 |
| 2012/0203038 | A1 * | 8/2012 | Mattingly | C10L 1/06 |
| | | | | 585/1 |

* cited by examiner

COMPUTER IMPLEMENTED BLEND CONTROL SYSTEM AND METHOD FOR PREPARATION OF A HYDROCARBON BLEND

RELATED APPLICATIONS

This application claims the benefit of Indian Patent Application No. 60/MUM/2013 filed on Jan. 8, 2013. The entire disclosure of this application is incorporated herein by reference.

FIELD OF THE DISCLOSURE

The present disclosure relates to a computer implemented blend control system and method for preparation of a hydrocarbon blend.

Definitions of Terms Used in the Specification

As used in the present disclosure, the following words and phrases are generally intended to have the meanings as set forth below, except to the extent that the context in which they are used indicate otherwise.

The term 'attribute' as used in this specification includes the composition of various component streams of the hydrocarbon blend, property specifications of the hydrocarbon blend, physical/chemical structure of the hydrocarbon blend and performance characteristics of the hydrocarbon blend.

The term 'composition of component streams of the hydrocarbon blend' as used in this specification includes the composition of reformate, alkylate, FCC naphtha, straight run napha, ethanol, and tertiary amyl methyl ether.

The term 'property specifications of the hydrocarbon blend' as used in this specification includes property specifications such as RON (research octane number), MON (motor octane number) and density, composition of sulphur in the hydrocarbon blend, density of hydrocarbon blend, composition of benzene, olefins and aromatics, cetane number and cetane index of the hydrocarbon blend, flash point measurements, and cloud point/cold filter plugging point measurements.

The term 'property data' of a hydrocarbon blend in the specification includes octane number (RON), motor octane number (MON), reid vapor pressure (RVP), density, cetane number, cetane index, cloud point, cold filter plugging point, and flash point.

The term 'composition data' of a hydrocarbon blend in the specification includes the composition of reformate, alkylate, FCC naphtha, straight run napha, ethanol, tertiary amyl methyl ether.

The term 'analyzing' includes using a computer/microprocessor and appropriate software to identify molecular species and reconcile data from various sensing technologies. The analysis step results in characterization of either the composition or the property of hydrocarbon blends.

The term 'product specification' or 'standard specification' means a list of properties that is specified by customers to ensure that the product meets a required quality.

The term 'product blends' refers to mixtures of hydrocarbon streams used to meet specific product specifications.

The term 'Controlling' means adjusting the flow of component streams either manually or through an automated system.

BACKGROUND OF THE INVENTION

Products from refineries such as gasoline, diesel etc. are produced by blending various component streams in order to meet product specifications. For example, gasoline blend is produced in a refinery by blending streams such as reformate, alkylate, FCC naphtha (fluid catalytic cracking naphtha), straight run naphtha, ethanol, TAME (tertiary amyl methyl ether), etc. Gasoline production is constrained by property specifications such as RON (research octane number), MON (motor octane number), RVP (reid vapor pressure), density, distillation, sulfur, aromatics, olefins, benzene and the like. Each of these component streams have different properties and are blended in various proportions to meet gasoline specifications.

These component streams have minor to large property fluctuations on a day to day basis. Based on the component stream property values, the blend proportions are altered to meet the specifications. Experimental techniques and tests for analysis of gasoline include RON/MON by CFR (co-operative fuel research) engine test (ASTM D2700, EN 25163, IP 236, ASTM D2699, EN 25164, IP 237), distillation by ASTM D86, RVP by ASTM D323, API/density by ASTM D-287, D-1298, sulfur content by X-Ray ASTM D-4294/D-2622, benzene and total aromatics by D3606, D5769, D5580, aromatics/olefins by ASTM D-1319, mercaptan sulfur by D-3227 etc. For diesel, these techniques include cetane number ASTM D-613, IP 41, EN ISO 5165, distillation by ASTM D86, cetane index by ASTM D-4737, IP 380, EN 4264, ASTM D-976, API/density by ASTM D-287, D-1298, flash point measurements, cloud point/cold filter plugging point measurements, sulfur by ASTM D2784, D3246, D3961, D4468, D6212, D6667, D5453, D7039, (EDXRF) ASTM D4294 etc.

The production of gasoline blend involves component streams in various proportions. Optimizing said proportions to maintain the product quality and to meet the gasoline specifications is very much necessary to avoid tank failures and to reduce demurrage of product tank. Optimization of the gasoline blend is conducted by analyzing the gasoline blend and said analysis is generally performed by using conventional techniques. Analysis of such gasoline blend involves the following steps: collecting liquid sample from the product tank, analysis of said sample, determining the proportions of component streams, optimizing said proportions to meet gasoline product specifications and controlling flow of the component streams to produce standardized gasoline blend product.

However, these approaches of analysis of gasoline blend encounter many drawbacks. Firstly, the above mentioned processes for analysis of the gasoline blend are time consuming. This makes it practically impossible to analyze gasoline blend in a short period of time and maintain the required product tank specification. During the time which is required for analysis and optimization of the gasoline blend, there are threats of tank failure, quality give away, loss of valuable streams, demurrage and the like.

Hydrocarbon product tanks, particularly gasoline/diesel product tanks are analyzed and certified before shipments. Analysis of a product tank is generally carried out based on the requirement of a product specification. For the above purpose, tank samples are analyzed by various common lab tests which include research octane number (RON)/motor octane number (MON) by co-operative fuel research (CFR) engine test, distillation by ASTM D86, reid vapor pressure (RVP) by ASTM D323, density by ASTM D1298-99, cetane number, cetane index, cloud point, cold filter plugging point, flash point etc. Conducting all these lab tests of samples from the product tank are time consuming and depend on laboratory facilities and the product specification. Furthermore, filling the product tank for shipment requires one/two days. Due to this reason, the product tank analysis is generally performed only once before shipment, which results in changes in the properties of hydrocarbons in the product tank. Such changes in the properties of hydrocarbons in the product tank affects the product tank which does not meet the desired specification, thus the product tank failures, quality give away and demurrage of the product tank and the like occur.

U.S. Pat. No. 6,966,326 provides a method for analyzing hydrocarbon liquids which are withdrawn from pipelines. Analysis and withdrawal of said hydrocarbon liquid is controlled by a system, wherein said system includes inter-communicating analyzers, control applications and controllers for analyzing and controlling the flow of a liquid from a pipeline system. Said system involves an analyzer which is a gas chromatography device.

GB1419655 discloses an apparatus for continuously monitoring gasoline blending operations, said apparatus comprising an analyzer, a detector, a multiplier and an uptown counter incorporating a visual display device. The apparatus particularly monitors the continuous blending operation of gasoline fluid to obtain a blended gasoline of the desired octane ratings.

GB1170616 provides an apparatus for maintaining the ratio between two flowing media, particularly for controlling the blending of gasoline and butane to provide gasoline with the desired volatility. The apparatus mentioned in this patent comprises: a ratio controller, a circuit for deriving a voltage from the control variable, and a resistance coupled between the circuit and the reservoir capacitor of the controller.

U.S. Pat. No. 3,751,644 provides a system for automatically adjusting proportions of given streams to form a gasoline blended product. The automatic system maintains the RVP and the octane number of the blended streams at particular pre-determined values.

U.S. Pat. No. 3,672,840 discloses a method and an apparatus for continuously determining and controlling a composition characteristic of the combustible fluid mixture wherein said composition characteristic is octane rating and said combustible fluid mixture is a gasoline blend.

JP5163493 discloses a method to obtain a gasoline product, said method includes controlling research octane value (ROV), density and vapor pressure of a mixture containing gasoline, reformate, light naphtha and butane; analysis of gasoline by using gas chromatography; and adjusting proportions of blended components based on analysis to give a gasoline having the desired octane value, density and vapor pressure.

Prior art lacks a system and a method which can carry out a quick and efficient analysis of a gasoline blend thereby optimizing blending proportions of the component streams to meet a standardized product specification. There is thus felt a need for a technique which can quickly analyze and optimize the gasoline blend and meet the gasoline product specification. By using said technique, analysis of the gasoline blend is performed outside a product tank and the proportions of component streams are optimized, thereby controlling the flow of the component streams for the production of a desired hydrocarbon blend.

OBJECTS

Some of the objects of the present disclosure are described herein below:

It is an object of the present disclosure to ameliorate one or more problems of the prior methods and systems, or to at least provide a useful alternative.

It is an object of the present disclosure to provide a system and a method for online analysis and optimization of hydrocarbon blends.

It is another object of the present disclosure to provide an online analysis of hydrocarbon blends by means of a gas chromatography based analyzer.

It is another object of the present disclosure to provide multiple measurements of a composition from a product tank for minimizing tank failures and quality give away.

It is another object of the present disclosure to provide a cost-effective system and method for online analysis and optimization of hydrocarbon blends.

It is yet another object of the present disclosure to provide a system and a method that reduces demurrage by quick tank certification.

Other objects and advantages of the present disclosure will be more apparent from the following description when read in conjunction with the accompanying figures which are not intended to limit the scope of the present disclosure.

SUMMARY OF THE INVENTION

The present disclosure envisages a computer implemented blend control system for preparation of a hydrocarbon blend from a plurality of component streams. The system, in accordance with the present disclosure comprises:
a) a product tank for receiving a mixture comprising the plurality of component streams;
b) at least one sensor and analyzer, the at least one sensor and analyzer sensing and analyzing a first attribute of the mixture and obtaining a first attribute data;
c) at least one processor operatively connected to the at least one sensor and analyzer, the at least one processor processing the first attribute data, obtaining a second attribute, and deriving a second attribute data; and
d) at least one optimizer having,
  i) data storage means for storing attribute based model data,
  ii) a receiver for receiving the second attribute data, and
  iii) a comparator, the comparator comparing the second attribute data with the attribute based model data and computing an optimized proportion data between each of the component streams in the plurality of component streams to enable selective drawing of the component streams into the product tank for preparing the hydrocarbon blend.

In accordance with the present disclosure, the system further comprises a flow regulator cooperating with the at least one optimizer and to the product tank, the flow regulator controlling the flow of the component streams into the product tank based on the optimized proportion data.

In accordance with the present disclosure, the first and the second attributes being same or different from each other.

In accordance with the present disclosure, the first attribute data is the data corresponding to the mixture comprising a plurality of component streams.

In accordance with the present disclosure, the first attribute of the mixture is a composition attribute, the first attribute data is composition data, the second attribute of the mixture is a property attribute, and the model data is property based model data.

In accordance with the present disclosure, the second attribute of the mixture is a composition attribute, and the model data is composition based model data.

In accordance with the present disclosure, the system further comprises a plurality of component tanks operatively connected to the product tank and adapted to store the plurality of component streams therein.

In accordance with the present disclosure, the flow regulator is adapted to adjust at least one control valve.

In accordance with the present disclosure, the flow regulator comprises at least one flow sensor.

In accordance with the present disclosure, the at least one sensor and analyzer comprises a combination of a separating means and at least one detector means.

In accordance with the present disclosure, the at least one sensor and analyzer is adapted to sense the first attribute at pre-determined time intervals, the time intervals ranging between 1 hour and 24 hours.

The present disclosure further envisages a computer implemented method for preparation of a hydrocarbon blend from a plurality of component streams. The method, in accordance with the present disclosure includes the following steps:

a) dispensing a mixture comprising the plurality of component streams, to a product tank;
b) sensing and analyzing a first attribute of the mixture and computing a first attribute data;
c) comparing the first attribute data with pre-stored model data;
d) computing optimized values of proportions based on the comparison of the first attribute data to determine proportion data between each of the component streams; and
e) controlling flow of the component streams based on the proportion data for preparing the hydrocarbon blend.

In accordance with the present disclosure, the method further comprises the steps of:

processing the first attribute data to derive a second attribute data;

comparing the second attribute data with the pre-stored model data and computing optimized values of proportions based on the comparison of second attribute data with the pre-stored model data;

In accordance with the present disclosure, the first attribute and the second attribute are the same.

In accordance with the present disclosure, the first attribute and the second attribute are different from one another.

BRIEF DESCRIPTION OF ACCOMPANYING DRAWINGS

DETAILED DESCRIPTION OF THE ACCOMPANYING DRAWINGS

In accordance with one aspect of the present disclosure, there is provided a computer implemented blend control system for preparing a hydrocarbon blend using a plurality of component streams. The blending of the components from a plurality of component streams is typically based on determination of properties of the component streams. The properties of component streams are determined by performing an analysis of the composition streams which are typically stored in a product tank. To determine the properties of the component streams, firstly, the composition of each of the component streams is measured using gas chromatography (GC) technique. Multiple analyses of the composition of each of the component streams is carried out at a time interval ranging between 1 hour and 24 hours, preferably at a time-interval of 2 hours. The gas chromatography analyzer estimates the properties associated with each of the component streams based on the analysis of the composition corresponding to each of the component streams. The estimated property data provided by the gas chromatography technique is converted into property data of hydrocarbon blend.

In accordance with the present disclosure, for most of the estimated properties, the property estimates are within ASTM accuracy of the corresponding process. Properties of hydrocarbons such as research octane number (RON), motor octane number (MON), reid vapor pressure (RVP), density, cetane number, cetane index, cloud point, cold filter plugging point, flash point and a ratio of components in the hydrocarbon blend can be analyzed.

Mathematical expressions that are used for converting the composition data of a component stream to property data are:

$$\rho_{stream} = \sum_i \rho_i v_i$$

$$RVP_{stream} = \sum_i \alpha \cdot RVP_i^\beta \cdot v_i$$

where $\rho_{stream}$ and $\rho_i$ are the densities of the streams and their molecular components, $RVP_{stream}$ and $RVP_i$ are the RVPs of the streams and their molecular components Composition to property models are used to calculate properties. For gasoline, properties such as density, distillation properties, Reid Vapor Pressure (RVP), Research Octane Number (RON), Motor Octane Number (MON) and other secondary properties (e.g. drivability index which depends on distillation properties, antiknock index (AKI) depend on RON/MON and the like).

In accordance with the present disclosure, the gas chromatography analyzer comprises PIONA (paraffins, isoparaffins, olefins, naphthenes and aromatics) analyzer. The gas chromatography analyzer in accordance with the present disclosure is further configured to perform DHA (detailed hydrocarbon analysis) of each of the component streams.

Figure 1:
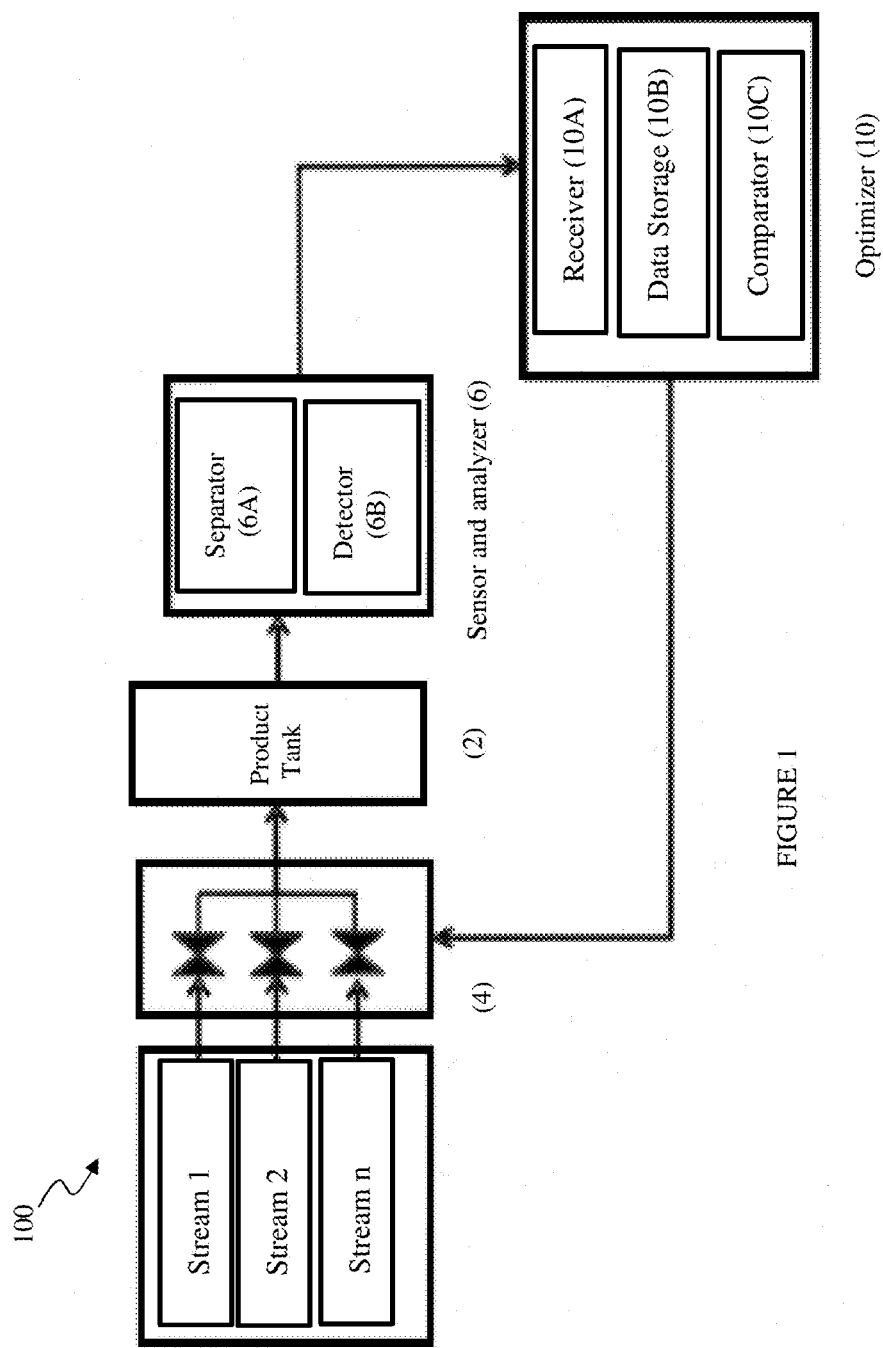
FIG. 1 illustrates a schematic of a computer implemented blend control system for property based/composition based blend optimization, in accordance with one embodiment of the present disclosure.

In accordance with one embodiment of the present disclosure, there is provided a computer implemented blend control system for selectively regulating the blending of at least two components by online analysis of each of the component streams which are obtained from a product tank. Referring to FIG. 1, there is shown a computer implemented blend control system 100 (hereinafter referred to as "system 100"). The system 100 in accordance with the present disclosure includes individual component tanks for storing respective component streams. The component streams (stream1, stream 2 . . . stream n) from individual component tanks flow into a product tank 2. The flow of the component streams from individual component tanks to the product tank 2 are controlled by flow regulator 4. The flow regulator 4 is operatively connected to the product tank 2 and each of the component tanks such that it can control the flow of the component streams from individual components tanks into the product tank 2.

In accordance with this embodiment of the present disclosure, the product tank 2 receives the mixture containing a plurality of components, wherein each of the components is drawn from the individual component tanks. The system 100 further includes at least one sensor and analyzer 6 which senses and analyzes properties (first attribute) of the received mixture since the first attribute in case of this embodiment of the disclosure is the property attribute. The sensor and analyzer 6 analyzes the property attributes of the received mixture and computes the corresponding property attribute data (first attribute data).

In accordance with this embodiment of the present disclosure, the system 100 further includes at least one optimizer 10 comprising data storage means 10B configured to store attribute based model data. The attribute based model data stored in the data storage means includes both property based model data and composition based model data. The optimizer 10 further includes a receiver 10A configured to receive the property attribute data (first attribute data) from the sensor and analyzer 6. The optimizer 10 further includes comparator 10C configured to compare the property attribute data (first attribute data) with the stored property based model data. By comparing the property attribute data with the stored property based model data, the comparator 10C computes optimized proportion data between each of the component streams in the plurality of components and enables selective drawing of the component streams based on their corresponding properties, into the product tank 2, for preparing the hydrocarbon blend. In accordance with this embodiment, the system 100 is a property based blend control system.

Figure 2:
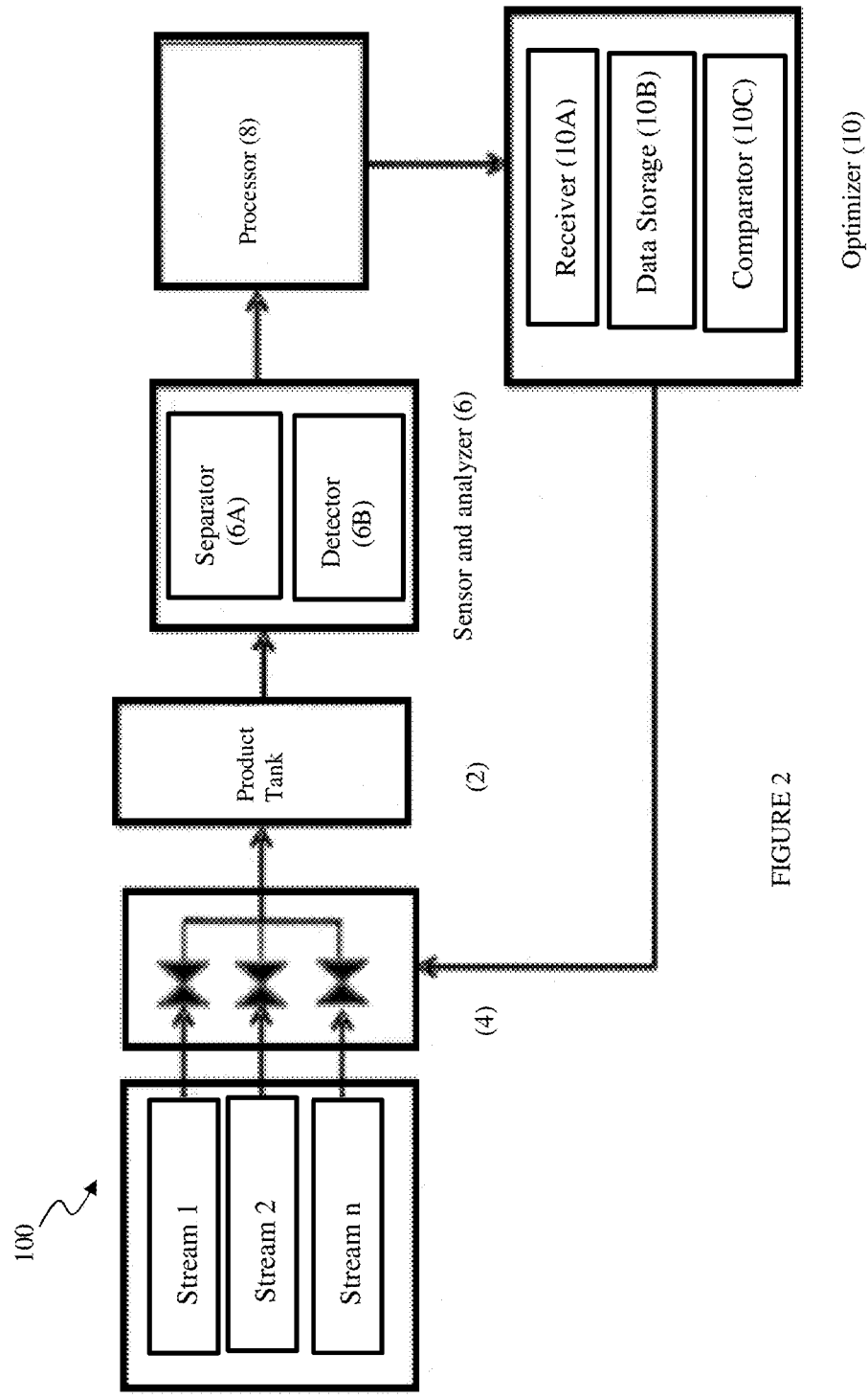
FIG. 2 illustrates a schematic of a computer implemented blend control system for property based/composition based blend optimization, in accordance with another embodiment of the present disclosure.

In accordance with another embodiment of the present disclosure, the system 100 further includes at least one processor 8 operatively connected to the sensor and analyzer 6 and configured to process the property data (first attribute data) and derive/compute a second attribute data (composition data), as depicted in FIG. 2. The composition data (second attribute data) computed by the processor 8 is transmitted to the comparator 10C for the purpose of comparison with the composition based model data. By comparing the composition attribute data with the stored composition based model data, the comparator 10C computes optimized proportion data between each of the component streams in the plurality of components and enables selective drawing of the component streams based on their corresponding compositions, into the product tank 2, for preparing the hydrocarbon blend.

In accordance with this embodiment of the present disclosure, the first attribute of the mixture of components is a property attribute, the first attribute data is property attribute data, the second attribute of the mixture of components is a composition attribute and the second attribute data is composition attribute data. Accordingly, the system 100 is a property based blend control system.

In accordance with still another embodiment of the present disclosure, the structural components of the embodiment of the disclosure are similar to the embodiment described in FIG. 1. The system in accordance with this embodiment includes individual component tanks for storing respective component streams. The component streams form individual component tanks are flown into the product tank 2 as shown in FIG. 1. The flow of the component streams from individual component tanks to the product tank 2 are controlled by flow regulator 4, as shown in FIG. 1. The flow regulator 4 is operatively connected to the product tank 2 and each of the component tanks such that it can control the flow of the component streams from individual components tanks into the product tank 2.

In accordance with this embodiment of the present disclosure, the product tank 2 receives the mixture containing a plurality of components, wherein each of the components is drawn from the individual component tanks. The system 100 further includes at least one sensor and analyzer 6 as shown in FIG. 1 which senses and analyzes the composition (first attribute) of the received mixture since the first attribute in case of this embodiment of the disclosure is the composition attribute. The sensor and analyzer 6 analyzes the composition attributes of the received mixture and computes the corresponding composition attribute data (first attribute data).

In accordance with this embodiment of the present disclosure, the system 100 further includes at least one optimizer 10 as shown in FIG. 1 comprising data storage means 10B configured to store attribute based model data. The attribute based model data stored in the data storage means includes both property based model data and composition based model data. The optimizer 10 further includes a receiver 10A configured to receive the composition attribute data (first attribute data) from the sensor and analyzer 6. The optimizer 10 further includes comparator 10C configured to compare the composition attribute data (first attribute data) with the stored composition based model data. By comparing the composition attribute data with the stored composition based model data, the comparator means 10C computes optimized proportion data between each of the component streams in the plurality of components and enables selective drawing of the component streams based on their corresponding properties, into the product tank 2, for preparing the hydrocarbon blend. In accordance with this embodiment, the system 100 is a composition based blend control system.

In accordance with yet another embodiment of the present disclosure, the system 100 further includes at least one processor 8 as shown in FIG. 2 and operatively connected to the sensor and analyzer 6 and configured to process composition data (first attribute data) and derive/compute a second attribute data (property data). The property data (second attribute data) computed by the processor 8 is transmitted to the comparator 10C for the purpose of comparison with the property based model data. By comparing the property attribute data with the stored property based model data, the comparator 10C computes optimized proportion data between each of the component streams in the plurality of components and enables selective drawing of the component streams based on their corresponding compositions, into the product tank 2, for preparing the hydrocarbon blend.

In accordance with this embodiment of the present disclosure, the first attribute of the mixture of components is a composition attribute, the first attribute data is composition attribute data, the second attribute of the mixture of components is a property attribute and the second attribute data is property attribute data. Accordingly, the system 100 is a composition based blend control system.

In accordance with the present disclosure, the flow regulator 4 comprises at least one flow sensor that senses the flow of the components through the flow regulator 4. The flow regulator 4 further comprises at least one control valve that controls the flow of the components through the flow regulator.

In accordance with the present disclosure, the sensor and analyzer 6 includes a separator 6A for selectively separating the various component streams before analyzing. The sensor and analyzer 6 further includes a detector 6B configured to detect the various components flowing into the sensor and analyzer from the product tank 2.

Based on the foregoing, FIG. 1 of the accompanying drawings illustrates the embodiment of the present disclosure, wherein the computer implemented system 100 for preparing a hydrocarbon blend does not include a processor. The processor is omitted from the system in the event that the first attribute, first attribute data and the second attribute, second attribute data are the same, i.e., both the first attribute and second attribute are property attributes are property attributes or composition attributes and both the first attribute data and second attribute data are property attribute data or composition attribute data.

In accordance with the present disclosure, the 'property data' includes but is not restricted to research octane number (RON), motor octane number (MON), reid vapor pressure (RVP), density, cetane number, cetane index, cloud point, cold filter plugging point, flash point and a ratio of components in hydrocarbon blend.

In accordance with another aspect of the present disclosure, there is provided a computer implemented method for the preparation of hydrocarbon blend, using the property based blend control system (such as the blend control system 100) of the present disclosure. The method, in accordance with the present disclosure includes the following steps:
  a) dispensing a mixture comprising the plurality of component streams, to a product tank;
  b) sensing and analyzing a property attribute (first attribute) of the mixture and computing a property attribute data (first attribute data);
  c) comparing the property attribute data (first attribute data) with pre-stored model data (property based model data);
  d) computing optimized values of proportions based on the comparison of the property attribute data (first attribute data) to determine proportion data between each of the component streams; and
  e) controlling flow of the component streams based on the proportion data for preparing the hydrocarbon blend.

In accordance with another embodiment of the present disclosure, the method further includes the steps of
  processing the first attribute data (property attribute data) to derive a second attribute data (composition attribute data); and
  comparing the second attribute data (composition attribute data) with the pre-stored model data (composition based model data) and computing optimized values of proportions based on the comparison of second attribute data (composition attribute data) with the pre-stored model data (composition based model data).

In accordance with still another embodiment of the present disclosure, there is provided a computer implemented method for the preparation of hydrocarbon blend, using the composition based blend control system of the present disclosure. The method, in accordance with the present disclosure includes the following steps:
  a) dispensing a mixture comprising the plurality of component streams, to a product tank;
  b) sensing and analyzing a composition attribute (first attribute) of the mixture and computing a property attribute data (first attribute data);
  c) comparing the composition attribute data (first attribute data) with pre-stored model data (composition based model data);
  d) computing optimized values of proportions based on the comparison of the composition attribute data (first attribute data) to determine proportion data between each of the component streams; and
  e) controlling flow of the component streams based on the proportion data for preparing the hydrocarbon blend.

In accordance with yet another embodiment of the present disclosure, the method further includes the steps of:
  processing the first attribute data (composition attribute data) to derive a second attribute data (property attribute data); and
  comparing the second attribute data (property attribute data) with the pre-stored model data (property based model data) and computing optimized values of proportions based on the comparison of second attribute data (property attribute data) with the pre-stored model data (property based model data).

Figure 3:
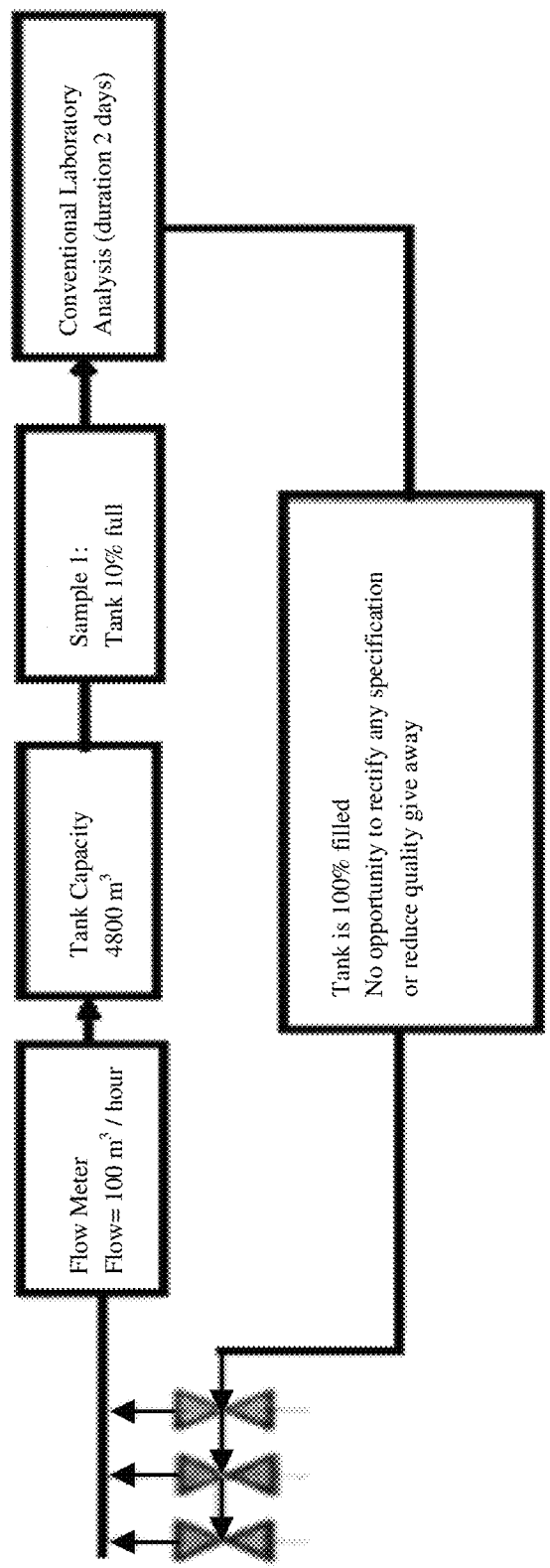
FIG. 3 illustrates a schematic of a conventional laboratory analysis of hydrocarbons.
Figure 4:
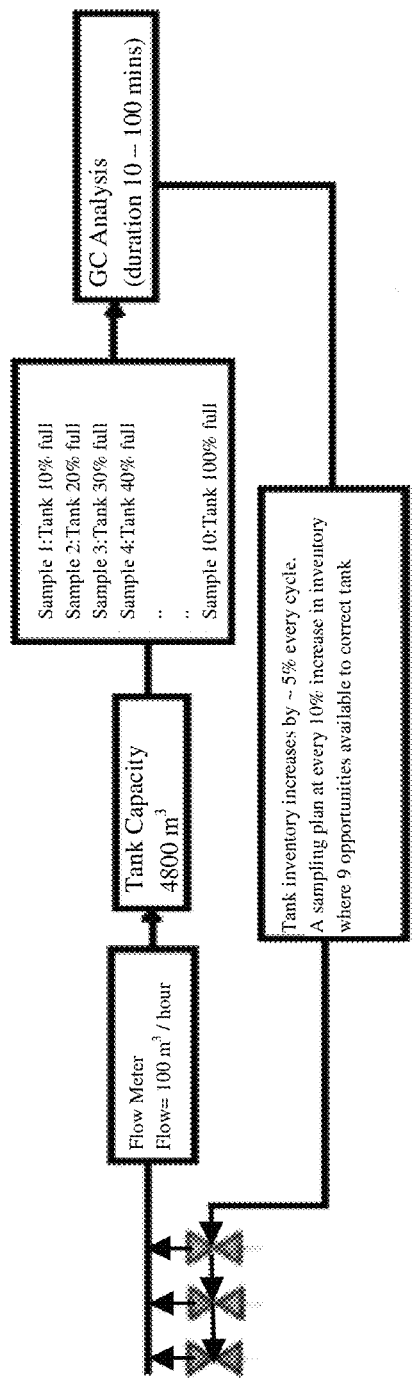
FIG. 4 illustrates a schematic of the analysis of hydrocarbons in accordance with the present disclosure.

Comparative processes for the analysis of hydrocarbons are depicted in FIG. 3 and FIG. 4. In the conventional laboratory analysis of hydrocarbons (FIG. 3), tank sample is analyzed once before shipment, due to the large time required for conventional laboratory analysis. There is no opportunity for frequent analysis of samples from the product tank. On the other hand, the process of the present disclosure (FIG. 4) gives an online analysis of hydrocarbon samples from the product tank in a very short time. Because of the quick analysis of hydrocarbons, there are around 9 opportunities available to correct the tank by optimizing and controlling the flow of component streams.

It may be observed that FIGS. 3 and 4 depict specific values of parameters including flow of streams, tank capacity, and time period for GC analysis. However, these values are used for depiction purposes, and should not be considered to be limiting the scope of the present invention.

The method and the system of the present disclosure which are employed for analyzing and optimizing the composition of the hydrocarbon blend are effective in obtaining the desired standardized gasoline product specification. The process of analysis of the hydrocarbon blend of the present disclosure is cost-effective and rapid as compared to the other conventional methods of analysis. By using said method of analysis, multiple measurements can be performed in a short period of time which further keeps the product tank in the required specification thereby minimizing tank failure/quality give away.

The system of the present disclosure analyses the product tank (2) samples, which helps in adjusting said intermediate proportions of the hydrocarbon blend, thereby saving valuable streams from loss and reducing demurrage by quick tank certification.

The system of the present disclosure will now be described with the help of the following non-limiting examples.

Example 1

Detailed hydrocarbon analyzer (DHA) with a flame ionization detector (FID) relies on single long gas chromatography (GC) column for separation, identification, quantification of naphtha-range (e.g. gasoline) molecular components. A PIONA analyzer relies on multiple GC columns and traps with specific functions to separate paraffins, iso-paraffins, olefins, naphthenes and aromatics to give a carbon number-wise breakup of naphtha-range samples. A GC-MS (Mass Spectrometry) relies on MS as a detector instead of FID for molecular identification.

Gasoline specifications depend on the grade. For example specifications of BSIII/BSIV are given below (Table 1).

TABLE 1

Gasoline specifications depending on the grade.
Product specifications

| Product spec. | BS II | BS III | BS IV |
|---|---|---|---|
| Density | 710-770 | 720-775 | 720-775 |
| RON min | 88 | 91 | 91 |
| MON min | — | 81 | 81 |
| AKI min | 84 | — | — |
| Sulfur max ppm | 500 | 150 | 50 |
| RVP | 60 max | 60 max | 60 max |
| Benzene max@ | 3 | 1 | 1 |
| Olefins max | — | 21 | 21 |
| Aromatics max | — | 42 | 35 |
| E 70 | 10-40 | 10-45 | 10-45 |
| E 100 | 40-70 | 40-70 | 40-70 |
| E 150 min | — | 75 | 75 |
| E 180 min | 90 | — | — |
| FBP Max | 215 | 210 | 210 |
| VLI max | | 750*/950** | |
| Oxygenates max | | 15 | 15 |

*Summer specification,
**Winter specification

TABLE 2

Comparison of (A) conventional laboratory analysis
and (B) analysis by method of the present disclosure

| Experiment | Time required | Sample quantity |
|---|---|---|
| (A) Conventional Analysis | | |
| Distillation | ~45 mins | >30 ml |
| Density | ~15 mins | >30 ml |
| RVP | ~15 mins | >30 ml |
| RON | ~60 mins | >30 ml |
| MON | ~60 mins | >30 ml |
| Benzene | ~45 mins | <2 ml |
| Olefins and Aromatics | ~20 mins | >10 ml |
| (B) Analysis by the method of the present disclosure | | |
| Compositional Analysis by single gas chromatography or multiple gas chromatography (PIONA) | 10 to 120 mins | <2 ml |

As depicted in table 2, seven conventional laboratory experiments (conventional analysis) can be replaced by one experiment by the method of the present disclosure. The method also minimizes sample quantity requirement by a substantial amount and also reduces the time and effort for analysis.

TECHNICAL ADVANTAGES

The technical advantages of the present disclosure include the realization of the following:
  providing a system and a method for online analysis and optimization of hydrocarbon blends;
  providing an online analysis of hydrocarbon blends by means of a gas chromatography based analyzer;
  providing multiple measurements of a composition from a product tank for minimizing tank failures and quality give away;
  providing a cost-effective system and method for online analysis and optimization of hydrocarbon blends; and
  providing a system and a method that reduce demurrage by quick tank certification.

The invention claimed is:

1. A computer implemented blend control system for preparation of a hydrocarbon blend from a plurality of component streams, said system comprising:
   a) product tank receiving a mixture comprising the plurality of component streams;
   b) at least one sensor and analyzer, the at least one sensor and analyzer sensing and analyzing a first attribute of the mixture and obtaining a first attribute data;
   c) at least one processor operatively connected to the at least one sensor and analyzer, the at least one processor programmed to process the first attribute data, obtaining a second attribute, and deriving a second attribute data;
   d) at least one optimizer connected to the at least one processor and having,
      i) data storage means for storing attribute based model data,
      ii) a receiver receiving said second attribute data, and
      iii) a comparator configured to compare the second attribute data with the attribute based model data and configured to compute an optimized proportion data between each of the component streams in the plurality of component streams to enable selective drawing of the component streams into the product tank for preparing the hydrocarbon blend; and
   e) a flow regulator cooperating with the at least one optimizer and operatively connected to the product tank, the flow regulator controlling the flow of the component streams into the product tank based on the optimized proportion data,
   wherein the first attribute of said mixture is a composition attribute, the first attribute data is composition data, the second attribute of said mixture is a property attribute, the second attribute data is property data, and the attribute based model data is property based model data.

2. The blend control system as claimed in claim 1, further comprising a plurality of component tanks operatively connected to the product tank and storing the plurality of component streams therein.

3. A computer implemented blend control system for preparation of a hydrocarbon blend from a plurality of component streams, said system comprising:
   a) product tank receiving a mixture comprising the plurality of component streams;
   b) at least one sensor and analyzer, the at least one sensor and analyzer sensing and analyzing a first attribute of the mixture and obtaining a first attribute data;
   c) at least one processor operatively connected to the at least one sensor and analyzer, the at least one processor programmed to process the first attribute data, obtaining a second attribute, and deriving a second attribute data;
   d) at least one optimizer connected to the at least one processor and having,
      i) data storage means for storing attribute based model data,
      ii) a receiver receiving said second attribute data, and
      iii) a comparator configured to compare the second attribute data with the attribute based model data and configured to compute an optimized proportion data between each of the component streams in the plurality of component streams to enable selective drawing of the component streams into the product tank for preparing the hydrocarbon blend; and e) a flow regulator cooperating with the at least one optimizer and operatively connected to the product tank, the flow regulator controlling the flow of the component streams into the product tank based on the optimized proportion data, wherein the first attribute of said mixture is a property attribute, the first attribute data is property data, the second attribute of said mixture is a composition attribute, the second attribute data is composition data, and the attribute based model data is composition based model data.

4. The blend control system as claimed in claim 3, further comprising a plurality of component tanks operatively connected to the product tank and storing the plurality of component streams therein.

* * * * *